Patented Mar. 1, 1927.

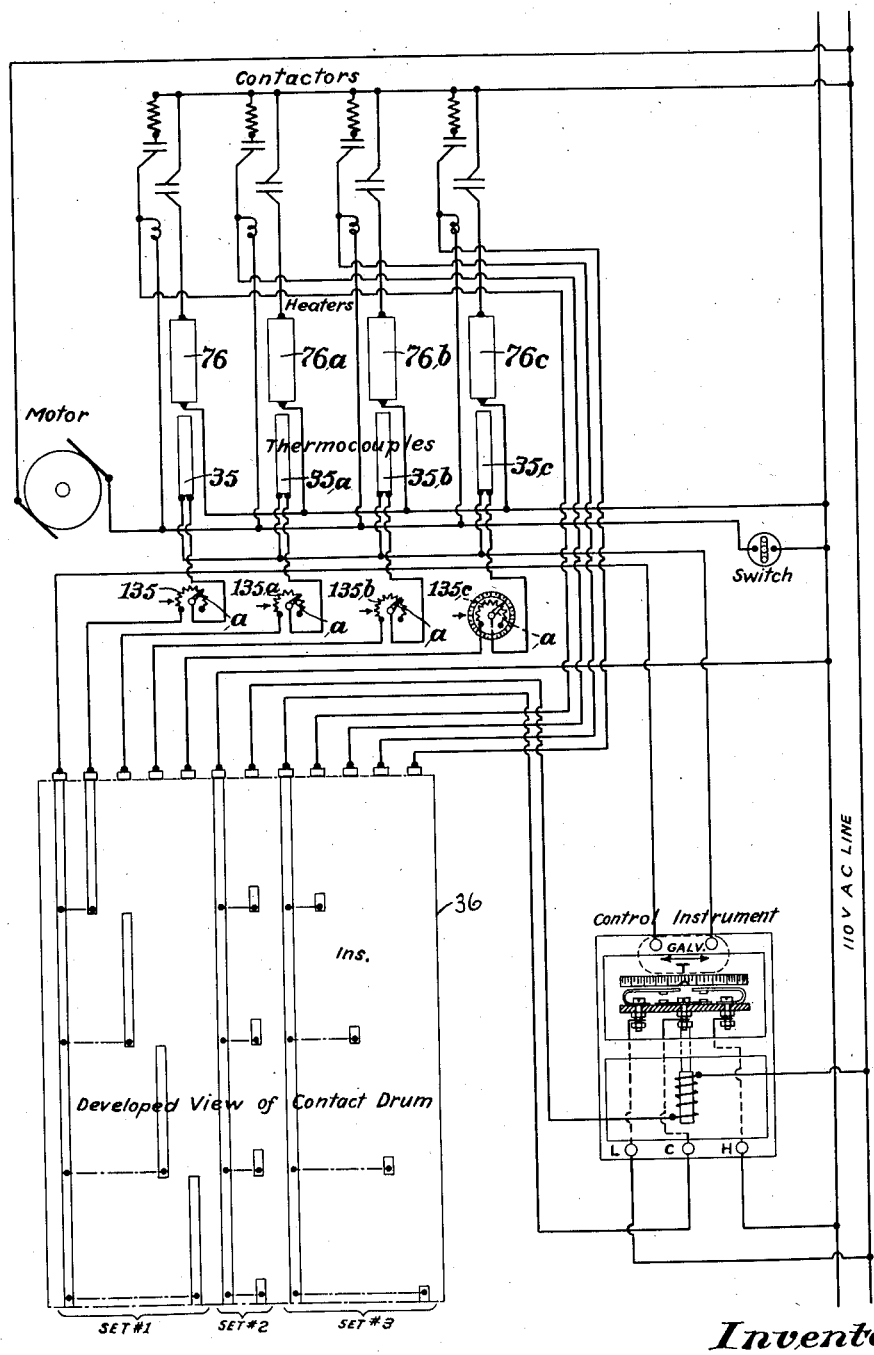

1,619,510

UNITED STATES PATENT OFFICE.

HOWARD A. HANDS, OF WATERTOWN, MASSACHUSETTS, ASSIGNOR TO HOOD RUBBER COMPANY, OF WATERTOWN, MASSACHUSETTS, A CORPORATION OF MASSACHUSETTS.

MULTIPLE HEATER CONTROL.

Application filed December 30, 1926. Serial No. 158,004.

My present invention relates to improvements in means for regulating the temperature of a plurality of electric heaters and is in the nature of a modification of the invention disclosed by me in a prior application filed in the U. S. Patent Office on the 17th day of June, 1926, Serial No. 116,652, patented November 16, 1926, No. 1,607,077.

In that application I provide mechanical means in the shape of adjustable cams whereby, as each successive thermo-couple was connected to the control instrument, the setting would be changed to correspond to the temperature desired for any particular thermo-couple and corresponding heater.

The present invention aims to provide electrical means for accomplishing the same result, and the invention broadly stated, comprises the combination with the thermo-electric couple of each heater of means for varying or adjusting the amount of current induced therein by the temperature variations in the heater.

In order that the invention may be readily understood I have appended hereto a sheet of drawings in which the figure is a diagrammatic view corresponding to Fig. 1 of my aforesaid application with the present invention incorporated therein.

Referring by reference characters to this drawing the numerals 76, 76$^a$, 76$^b$ and 76$^c$ indicate the heaters; 35, 35$^a$, 35$^b$, and 35$^c$ the corresponding thermo-electric elements or couples, electrically connected to the control instrument so designated through the circuit controller 36 in a manner which will be readily understood from the diagrammatic view in view of the specific description contained in my aforesaid application which it is deemed unnecessary to repeat here.

Included in the electric circuit of each thermo-couple 35, etc. is a variable resistance 135, 135$^a$, 135$^b$ and 135$^c$ which may be of any desired type capable of adjustment to increase or diminish the flow of current, the movable element of each being operatively connected with or operated by a pointer $a$ cooperating with a dial for indicating the setting of the resistance.

In use the control table of the control instrument would be set for a temperature approximately equal to the average of all the temperatures to be controlled. For example, if the four heaters had respectively temperature settings of 326°, 330°, 332° and 334° the control instrument would be set for about 330°, which setting would be incorrect for all but the second heater.

For the first heater 76 therefore the resistance 135 in its thermo-couple circuit would be set for a lower value than normal so that a temperature of 326° at the hot junction point would cause as much current to flow through the galvanometer as would a temperature of 330° if the rheostat were at its normal setting. Similarly the resistances in the last two heaters would be increased to decrease the effect at the instrument of the higher temperatures at their hot junctions.

Assuming a resistance of the instrument leads, and the rheostat in its normal position of 300 ohms, an instrument setting of 330, and an air temperature of 70° the current thru the galvanometer would be $$\frac{330-70}{300}K$$

when K is a constant depending on the millivoltage generated by the type of couple used. Then $$C = \frac{240}{300}K = .8K.$$

To obtain this same current with a couple temperature of 326°, the resistance of the circuit would be 295 ohms, meaning that 5 ohms resistance would have to be cut out of the rheostat. Likewise for temperatures of 332° and 334°, resistances of 2½ and 5 ohms respectively would have to be added. An ordinary 30 ohm radio rheostat would, therefore, be sufficient for a temperature variation of plus or minus 12°, and a 100 ohm rheostat of plus or minus 40°.

Rheostat dials properly marked would indicate the number of degrees above or below the instrument setting for which any circuit is set. By turning the dial to its normal position the correct temperature could be read when desired.

With such an arrangement the contact table of the instrument will not be continually moved from one place to another and will, therefore, cause less wear on the instrument than does the present method. The fact that the position of equilibrium for the galvanometer is always the same means that it will come to rest more quickly, and the cycle of the operation can be speeded up somewhat.

Having thus described my invention what I claim is:—

1. In an automatic temperature regulator for a plurality of electric heaters, a plurality of thermo-electric elements associated with said heaters, a plurality of circuit controllers for regulating the current supplied to said heaters, a single control instrument adapted to be influenced by one or another of said thermo-electric elements, a common distributor with switches and connections whereby the single control instrument is placed in operative relation with one or another of said thermo-electric elements and with the corresponding circuit controllers, and manually controllable means for independently varying the electrical action of each thermo-electric element.

2. In an automatic temperature regulator for a plurality of electric heaters, a plurality of thermo-electric elements associated with said heaters, a plurality of circuit controllers for regulating the current supplied to said heaters, a single control instrument adapted to be influenced by one or another of said thermo-electric elements, a common distributor with switches and connections whereby the single control instrument is placed in operative relation with one or another of said thermo-electric elements and with the corresponding circuit controllers, an adjustable electric resistance included in the circuit of each thermo-electric element, and indicating operating means cooperating with each resistance.

In testimony whereof, I affix my signature.

HOWARD A. HANDS.